UNITED STATES PATENT OFFICE.

LUDWIG FROMM AND RUDOLF SCHMIDT, OF DRESDEN, GERMANY.

PROCESS OF MAKING EXTRACTS.

SPECIFICATION forming part of Letters Patent No. 595,296, dated December 14, 1897.

Application filed December 7, 1896. Serial No. 614,836. (No specimens.)

*To all whom it may concern:*

Be it known that we, LUDWIG FROMM and RUDOLF SCHMIDT, subjects of the King of Saxony, residing at Dresden, in the Kingdom of Saxony, in the German Empire, have invented certain new and useful Improvements in Processes of Obtaining Vegetable Extracts, of which the following is a specification.

The present invention has for its object the production of fatty and albuminous substances contained in large quantities in many vegetables and to obtain such substances in such form as to allow of their being utilized without any further treatment for mixing with alimentary substances rich in carbohydrates.

The fruits of different kinds of palms, of stone-pines and olive-trees, most nuts, various kinds of beans—such as, for instance, soy-beans—and seeds containing oil, such as poppy-seeds, contain large quantities of fat, vegetable albumen, and casein.

Whereas hitherto it has been usual to extract oil only from those vegetables containing oil by pressing or lixiviating, the remaining valuable substances—namely, vegetable albumen and casein—being used only as food for animals, the present invention enables these vegetable substances to be extracted together and simultaneously without disturbing the combination between said oil or fat and the albuminous substances and alimentary salts, the vegetable albumen being converted into soluble easily-digested form.

The invention therefore enables all the alimentary substances rich in carbohydrates, but poor in fat and albumen—viz., alimentary substances of vegetable origin—to be improved—that is to say, to make the proportion of carbohydrates, fat, and albumen such that they are fully utilized in the human body.

The process is as follows: The vegetable substances containing oil which are to be used are first finely ground in a mill or other suitable apparatus. The flour obtained is made into a tough paste with cold water, containing chlorid of sodium in the proportion of from five to ten per cent., by weight, to that of the flour. The paste is kneaded for about one hour between stone or porcelain rollers, the mass being introduced between the rollers over and over again. The result of such treatment is that the fat becomes thoroughly mixed with the albumen, and the latter is converted into a soluble form by the addition of the salt. Instead of salt (chlorid of sodium) any other suitable solvent—such, for instance, as hydrochloric acid, monobasic phosphate or potash in a weak solution, of one per cent. at the utmost, caustic potash, essence of pepsin, say five per cent., and the like—may be used to assist the formation of peptones. All these modifications are, however, of secondary importance and do not alter the principle of the invention. The mass after having been ground between the rollers is dissolved in hot water of about 50° to 60° centigrade and converted into an emulsion by stirring. This liquid, of a milky white color, is then freed in a centrifugal apparatus of all the impurities, cellulose, &c., and finally cooked by steam in a vacuum till it forms a thick mass, it being important that the mass should be stirred during the whole time. The extract so obtained is easily soluble in water and contains, according to the vegetable substances used, up to fifty per cent. of fat and twenty-five per cent. of albumen. It therefore forms a valuble addition to all alimentary substances rich in carbohydrates for human and animal use.

We claim—

1. A process for the extraction of fatty and albuminous substances from vegetables containing oil, consisting in finely grinding the vegetable substances and converting the mass into a paste with cold water, in which is dissolved from five to ten per cent. of chlorid of sodium, then thoroughly kneading or mixing the mass, converting the same into an emulsion with water, freeing the liquid of impurities, and finally reducing the substance to a thick mass by steam in a vacuum.

2. A process for the extraction of fatty and albuminous substances from vegetables containing oil, consisting in finely grinding the vegetable substances and converting the mass into a paste with cold water, containing a solvent adapted to render the albumen soluble, then thoroughly kneading or mixing the mass, converting the same into an emulsion with water, freeing the liquid of impurities and finally reducing the substance to a thick mass by steam in a vacuum, as described.

In testimony whereof we have hereto set our hands in the presence of the two subscribing witnesses.

LUDWIG FROMM.
RUDOLF SCHMIDT.

Witnesses:
HERNANDO DE SOTO,
HERMANN GÖHRING.